United States Patent
Abrams et al.

(10) Patent No.: US 10,002,040 B2
(45) Date of Patent: Jun. 19, 2018

(54) DETECTION AND AUTOMATIC TRANSFER OF STANDALONE SYSTEM DUMPS

(71) Applicant: INTERNATIONAL BUSINESS MACHINES CORPORATION, Armonk, NY (US)

(72) Inventors: Robert M. Abrams, Wappinger Falls, NY (US); Nicholas R. Jones, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 14/987,055

(22) Filed: Jan. 4, 2016

(65) Prior Publication Data

US 2017/0192831 A1 Jul. 6, 2017

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 11/0784* (2013.01)

(58) Field of Classification Search
CPC ..... G06F 11/07; G06F 11/079; G06F 11/0709
USPC ........................................................ 714/37
See application file for complete search history.

(56) References Cited

U.S. PATENT DOCUMENTS

| | | | |
|---|---|---|---|
| 6,775,698 B1 | 8/2004 | Simone | |
| 7,281,163 B2 | 10/2007 | Brown et al. | |
| 9,185,513 B1 * | 11/2015 | Hsieh | G06F 8/447 |
| 9,710,321 B2 * | 7/2017 | Zhao | G06F 11/079 |
| 2003/0233525 A1 * | 12/2003 | Reeves | G06F 11/1441 |
| | | | 711/162 |
| 2005/0120162 A1 * | 6/2005 | Sivaram | G06F 11/0706 |
| | | | 711/101 |
| 2005/0283672 A1 * | 12/2005 | Brown | G06F 11/0778 |
| | | | 714/31 |
| 2008/0126301 A1 * | 5/2008 | Bank | G06F 11/366 |
| 2011/0231710 A1 * | 9/2011 | Laor | G06F 11/0712 |
| | | | 714/38.11 |

(Continued)

OTHER PUBLICATIONS

Cisco Systems, Inc., "Creating Core Dumps," Document ID: 12687, Jun 24, 2008, pp. 1-6.

*Primary Examiner* — Kamini B Patel
(74) *Attorney, Agent, or Firm* — Cantor Colburn LLP; William A. Kinnaman, Jr.

(57) ABSTRACT

Technical solutions are described for transferring standalone dump data of a system to a diagnosis system. An example method includes detecting a creation of a multi-volume standalone dump dataset. The method also includes, in response to detecting the creation, creating an entry in a list of standalone dump datasets, the entry corresponding to the multi-volume standalone dump dataset created. The method also includes detecting a change in data stored in the multi-volume standalone dump dataset; and in response to detecting the change, updating the corresponding entry in the list of standalone dump datasets, and generating a sequential standalone dump based on the multi-volume standalone dump dataset. The method also includes alerting the diagnosis system of the sequential standalone dump. The method also includes transferring the sequential standalone dump for access by the diagnosis system.

19 Claims, 10 Drawing Sheets

(56) References Cited

U.S. PATENT DOCUMENTS

| | | | | |
|---|---|---|---|---|
| 2012/0054722 A1* | 3/2012 | Takeda | ............... | G06F 8/314 |
| | | | | 717/128 |
| 2012/0151265 A1* | 6/2012 | Bender | ............... | G06F 11/366 |
| | | | | 714/37 |
| 2014/0215151 A1* | 7/2014 | Yasuhara | ............... | G06F 3/0619 |
| | | | | 711/114 |
| 2015/0261597 A1* | 9/2015 | Darisa | ............... | G06F 11/0727 |
| | | | | 714/48 |
| 2016/0085656 A1* | 3/2016 | Braun | ............... | G06F 11/3476 |
| | | | | 714/38.11 |
| 2016/0378579 A1* | 12/2016 | Zhao | ............... | G06F 11/0748 |
| | | | | 714/37 |
| 2017/0111354 A1* | 4/2017 | Buendgen | ............... | H04L 63/0853 |

* cited by examiner

DETECTION AND AUTOMATIC TRANSFER OF STANDALONE SYSTEM DUMPS

BACKGROUND

The present application relates to computer technology, and more specifically, to improving a computer system by improving efficiency of collecting diagnostic information in case of an error.

In a computer system, when an operating system encounters a failure, such as a failure that causes the system to restart, it is desirable to collect diagnostic information on the state of the system and the steps that caused the failure to occur. Accordingly, in case of a failure, the system records a dump, which is a snapshot of the virtual and/or real storage, and other aspects of the system. The recorded snapshot contains information to diagnose the problem that caused the failure. The process of capturing the dump is time sensitive and resource consuming. Further, transferring the recorded dump for diagnosis is resource intensive.

SUMMARY

According to an embodiment, a computer implemented method for transferring standalone dump data of a system to a diagnosis system includes detecting a creation of a multi-volume standalone dump dataset. The computer implemented method also includes, in response to detecting the creation, creating an entry in a list of standalone dump datasets, the entry corresponding to the multi-volume standalone dump dataset created. The computer implemented method also includes detecting a change in data stored in the multi-volume standalone dump dataset; and in response to detecting the change, updating the corresponding entry in the list of standalone dump datasets, and generating a sequential standalone dump based on the multi-volume standalone dump dataset. The computer implemented method also includes alerting the diagnosis system of the sequential standalone dump. The computer implemented method also includes transferring the sequential standalone dump for access by the diagnosis system.

According to another embodiment, a system for transferring standalone dump data to a diagnosis system includes a memory; and a processor. The processor detects a creation of a multi-volume standalone dump dataset. The processor, in response to detecting the creation, creates an entry in a list of standalone dump datasets, the entry corresponding to the multi-volume standalone dump dataset created. The processor also detects a change in data stored in the multi-volume standalone dump dataset. The processor also updates the corresponding entry in the list of standalone dump datasets. The processor also generates a sequential standalone dump based on the multi-volume standalone dump dataset. The processor also alerts the diagnosis system of the sequential standalone dump. The processor also transfers the sequential standalone dump for access by the diagnosis system.

According to another embodiment, a computer program product for transferring standalone dump data to a diagnosis system includes a computer readable storage medium. The computer readable storage medium includes computer executable instructions to detect creation of a multi-volume standalone dump dataset. The computer readable storage medium includes computer executable instructions to, in response to detecting the creation, create an entry in a list of standalone dump datasets, the entry corresponding to the multi-volume standalone dump dataset created. The computer readable storage medium includes computer executable instructions to detect a change in data stored in the multi-volume standalone dump dataset, and in response to detecting the change update the corresponding entry in the list of standalone dump datasets. The computer readable storage medium includes computer executable instructions to generate a sequential standalone dump based on the multi-volume standalone dump dataset. The computer readable storage medium includes computer executable instructions to alert the diagnosis system of the sequential standalone dump. The computer readable storage medium includes computer executable instructions to transfer the sequential standalone dump for access by the diagnosis system.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
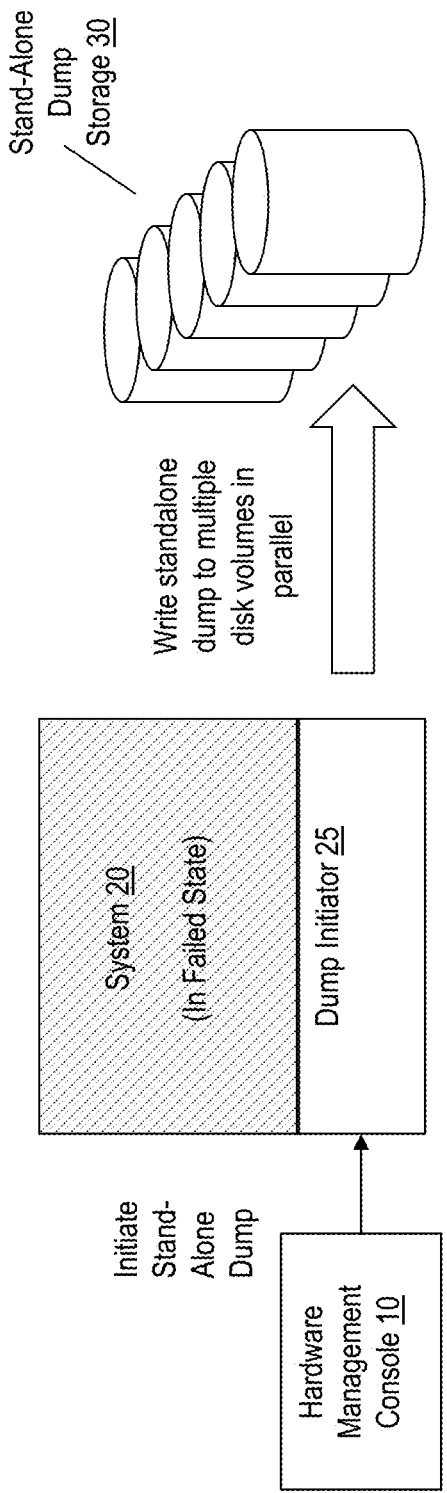
FIG. 1 illustrates an example computer system that includes a snapshot generator in accordance with an embodiment.

Disclosed here are technical solutions for sending, in an automated manner, a standalone dump containing information associated with a system failure for diagnosing a cause and/or remedy of a system failure in response to which the standalone dump was recorded. For example, a manufacturer or a third-party diagnosis service provider of the system may receive the standalone dump. Automating the transfer of the standalone dump improves both, speeding up the diagnosis processing for time sensitive problems and reducing potential errors during transfer of the standalone dump data.

An operating system, such as Z/OS™ may record different types of dumps in response to different types of system failures and/or errors. Table 1 describes example types of dumps. The technical solutions described herein are regarding standalone dumps, which are typically recorded in response to catastrophic failures.

TABLE 1

| Type of dump | Description |
| --- | --- |
| ABEND Dump | An ABEND dump is used when ending an authorized program or a problem program because of an uncorrectable error. These dumps show:<br>The virtual storage for the program requesting the dump.<br>System data associated with the program.<br>The system can produce three types of ABEND dumps, SYSABEND, SYSMDUMP, and SYSUDUMP. Each one dumps different areas. Select the dump that gives the areas needed for diagnosing your problem. The IBM ® supplied defaults for each dump are:<br>SYSABEND dumps - The largest of the ABEND dumps, containing a summary dump for the failing program plus many other areas useful for analyzing processing in the failing program.<br>SYSMDUMP dumps - Contains a summary dump for the failing program, plus some system data for the failing task. SYSMDUMP dumps are the only ABEND dumps that you can format with IPCS.<br>SYSUDUMP dumps - The smallest of the ABEND dumps, containing data and areas only about the failing program. |
| Transaction Dump (IEATDUMP) | Similar to SNAP dumps, an application can issue an IEATDUMP macro to dump virtual storage areas of interest if the application is running. However, the result is an unformatted dump that must be analyzed using IPCS. |
| SNAP Dump | A SNAP dump is used when testing a problem program. A SNAP dump shows one or more areas of virtual storage that a program, while running, requests the system to dump. A series of SNAP dumps can show an area at different stages in order to picture a program's processing, dumping one or more fields repeatedly to let the programmer check intermediate steps in calculations. SNAP dumps are preformatted, you cannot use IPCS to format them. Note that a SNAP dump is written while a program runs, rather than during abnormal end. |
| Stand-Alone Dump | A stand-alone dump is used when:<br>The system stops processing.<br>The system enters a wait state with or without a wait state code.<br>The system enters an instruction loop.<br>The system is processing slowly.<br>These dumps show central storage and some paged-out virtual storage occupied by the system or stand-alone dump program that failed. Stand-alone dumps can be analyzed using IPCS. |
| SVC Dumps | Supervisor Call (SVC) dumps can be used in two different ways:<br>Most commonly, a system component requests an SVC dump when an unexpected system error occurs, but the system can continue processing.<br>An authorized program or the operator can also request an SVC dump when they need diagnostic data to solve a problem. SVC dumps contain a summary dump, control blocks and other system code, but the exact areas dumped depend on whether the dump was requested by a macro, command, or SLIP trap. SVC dumps can be analyzed using IPCS. |

FIG. 1 illustrates a system 20 that is in a failed state. A hardware management console 10, upon detecting the failed state, may initiate a dump initiator 25 to generate a standalone dump and write the standalone dump to standalone dump storage 30. In an example, the standalone dump storage is a storage device with multiple disk volumes, such as a direct access storage device (DASD) or tapes, and the dump initiator 25 stores the standalone dump to the multiple volumes in parallel. In another example, the dump initiator 25 initiates the generation of the standalone dump by itself, without the hardware management console 10. For example, SYSTEM Z™ facilitates an automated initiation of the standalone dump upon detection of a wait state of the operating system. In addition, third-party components, like BMC PATROL™ automate the initiation of standalone dump.

The dump initiator 25 may be a separate single purpose component, or an instance of an operating system executed by the hardware in the system 20, that records the stand alone dump. Typically, the dump initiator 25 captures the standalone dump under catastrophic operating system failure situations, because capturing the standalone dump halts the system 20. For example, the dump initiator 25 records the standalone dump when the operating system enters a wait state or when the system halts due to an operating system failure or an operator request. The standalone dump may contain, among other records, the contents of memory of the system 20 at the time of the system halt, which may be used by the diagnosis service provider, such as a manufacturer of the operating system, or a manufacturer of the system, to determine the cause of the failure.

Thus, dump initiator 25 records the standalone dump when the system is in a failed (or dead) state, that is, when the system is not executing. Alternatively or in addition, the dump initiator 25 records the standalone dump by halting the execution of the system, and initiating the standalone dump record. Since the system 20 is not executing, transferring the recorded standalone dump for diagnosis, typically, may not occur until the system 20 is restarted and functional. The catastrophic failures that cause the standalone dump to be recorded are usually time-sensitive and require immediate debugging and diagnosis to prevent further loss of a client that may be using/operating the system 20. Early intervention may also prevent other clients, using/operating similar systems from experiencing similar problems. Thus, improving speed and efficiency of determining the cause of the system failure and a workaround, can mitigate losses and further distinguish a service provider and/or manufacturer of the system 20 from competitors.

The technical solutions described herein facilitate transfer of the standalone dump for diagnosing such system failures in an improved, automatic, and timely manner, such as within a predetermined time interval since occurrence of the system failure. The technical solutions described herein, unlike typical automation systems for standalone dumps, which automate the initiation of the standalone dump, facilitate automating a processing of the standalone dump output prior to transferring the standalone dump to the diagnosis provider.

For example, the technical solutions reduce time taken for sending the standalone dump for diagnosis. Further, the technical solutions facilitate sending a copy of the standalone dump that contains concatenated data based on data stored in the multi-volume standalone dump storage 30. The dump initiator 25 may store the standalone dump into the standalone dump storage 30 out of sequence and distributed across a number of volumes for increased speed. Accordingly, the technical solutions determine a sequential order of and rearrange records in the standalone dump before sending the standalone dump for diagnosis. Further, the technical solutions facilitate creating and sending an entire and/or a subset of the standalone dump. The subset contains a subset of the entire standalone dump that is typically sent faster than the entire dataset because of the subset being smaller. In an example, the entire sequentialized standalone dump may be retained, and sent for the diagnosis in the event the subset is insufficient for diagnosis. In addition, the technical solutions facilitate creating a problem management record (PMR) at the diagnosis service provider, which describes the nature of the system failure, before sending the standalone dump. In addition, the diagnosis service provider may specify that the records of the standalone dump be sent by a specific file transfer tool and/or protocol. Further yet, the technical solutions facilitate encrypting and/or compressing the standalone dump before transferring to the diagnosis service provider. The compression may further reduce amount of data transferred in case the standalone dump contains relatively large amount of data, for example 500 MB, 1 GB, 5 GB, 1 TB, and so on.

Further, an operating system, such as Z/OS™, facilitates recording a non-catastrophic dump, such as an SVC dump, and automates functions to gather and send diagnostic documentation of such a non-catastrophic dump. However, the technical solutions facilitate automating the standalone dump output gathering and transfer, which are recorded in case of catastrophic failures that cause the system 20 to halt (thus, the operating system is inactive). Typically, the system 20 facilitates an operator or a component of the system 20 to initiate collection of a SVC dump, which is a non-disruptive snapshot of memory, while the system 20 is operational. For example, the operator or the requesting component signals the active operating system, such as a problem data manager component of the operating system to collect related diagnostic logs at the time the SVC dump is created. However, techniques such as those used to automate an SVC dump do not work with standalone dumps, which are collected in response to catastrophic failures that cause the system 20 to be inactive, and other limitations corrected by the technical solutions, as described herein.

The technical solutions described herein facilitate monitoring standalone dump (SADMP) resources and automate tasks for sending the standalone dump for diagnosis. For example, the technical solutions monitor and detect creation, deletion, and changes to raw standalone dump datasets in the standalone dump storage 30 and record a current state to a list of raw standalone dump datasets and their attributes. A raw standalone dump dataset is either a newly created dataset ready to record a dump, or a dataset that contains the initial, un-prepared (raw) copy of the standalone dump. The datasets containing the standalone dump may be written into multiple physical volumes and may be written out of sequence. The technical solutions facilitate coagulating the standalone dump datasets, before analysis and sending the standalone dump datasets for diagnosis, for example, by copying the multi-volume standalone dump datasets to a sequential prepared standalone dump dataset. In an example, a subset of the sequentialized standalone dump is transferred and if deemed insufficient, the entire sequentialized standalone dump is transferred. The technical solutions further facilitate alerting a post-dump manager about the new prepared standalone dump, and optionally clearing the raw multi-volume standalone dump for reuse. Alerting the post-dump manager may trigger sending of the prepared standalone dump and related diagnostic data for diagnosis. For example, the post-dump manager may initiate transferring the problem diagnostic data to the manufacturer. Accordingly, the technical solutions facilitate an automatic standalone dump preparation and transfer for diagnosing. The operations to sequentialize the datasets and further transfer the datasets may take minutes to hours to complete, and any error during such operations, such as entering an incorrect parameter value, can corrupt the standalone dump datasets. Because of the complexity, automation of the preparation and transfer of the standalone dump is a significant improvement to the computer system.

Figure 2:
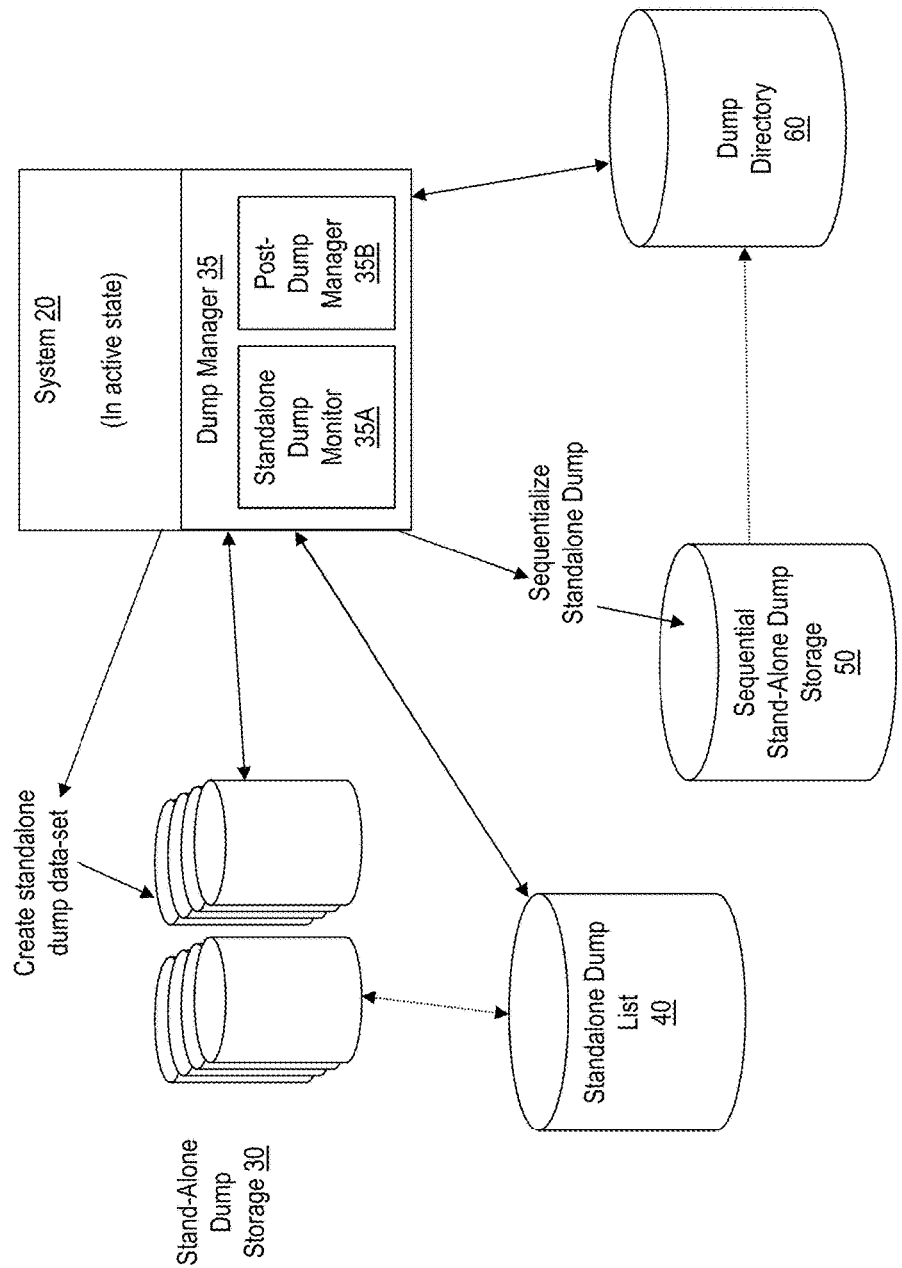
FIG. 2 illustrates example components for automatically monitoring standalone dump creation and transferring a standalone dump for diagnosis in accordance with an embodiment.
Figure 3:
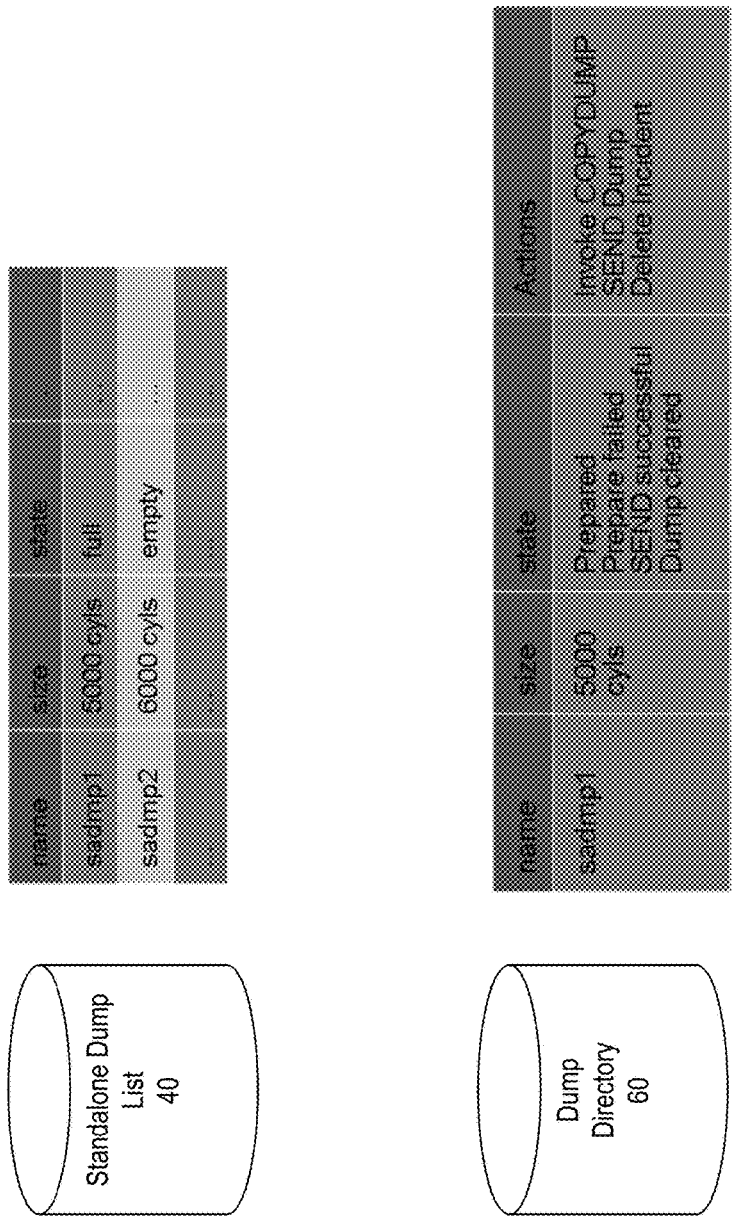
FIG. 3 illustrates example entries in a standalone dump list and a standalone dump incident list in accordance with an embodiment.

FIG. 2 illustrates example components for automatically monitoring standalone dump creation and transferring the standalone dump for diagnosis. The dump manager 35 includes components such as a standalone dump monitor 35A and a post-dump manager 35B. The standalone dump monitor 35A monitors creation, deletion, modification, of one or more standalone dump datasets in the standalone dump storage 30. A standalone dump dataset is a pre-allocated memory space that spans multiple volumes in the standalone dump storage 30. The standalone dump monitor 35A maintains a standalone dump dataset list 40 based on monitoring the datasets. The dump manager 35 may also store a sequential standalone dump in a sequential standalone dump storage 50 prior to transferring the sequential standalone dump for diagnosis. In an example, the post-dump manager 35B may be responsible to transfer the sequential standalone dump for diagnosis. The post-dump manager 35B may store information about the sequential standalone dump in a dump directory 60. The dump directory 60 may store a standalone dump incident list that stores attributes of each incident that results in a standalone dump. In addition, the dump directory 60 may store the sequential standalone dump or at least a location from which to access the sequential standalone dump. FIG. 3 illustrates example entries in the standalone dump dataset list 40 and the standalone dump incident list.

The standalone dump dataset list 40 contains information about 'raw' standalone dump storage 30. The dump manager 35 stores information about the multi-volume standalone dump storage 30 into the standalone dump dataset list 40. The datasets are referred to as being 'raw' since the dump manager 35 may store the data in these datasets in parallel, and thus out of order. Accordingly, the dump manager 35 prepares the sequential standalone dump that stores records of the standalone dump data in an order that the diagnossis system can process and analyze to identify a cause of the system failure. In an example, the standalone dump dataset list 40 contains information about the standalone dump datasets that the system 20 has allocated previously. The standalone dump dataset list 40 also indicates whether the allocated dump datasets contain dump data or are ready to record dump data. Thus, the standalone dump dataset list 40 includes entries that track standalone dump datasets that are ready to be used or have been used by the dump manager 35 when the system 20 previously failed and recorded a standalone dump. The standalone dump dataset list 40 does not track a sequential standalone dump that contained dump data that is processed by the post-dump manager 35B for sending for diagnosis. The standalone dump monitor 35A updates the entries in the standalone dump dataset list 40 in response to standalone dump datasets being created, initialized, reallocated, or deleted.

In an example, the standalone dump monitor 35A checks an entry in the standalone dump dataset list 40, and further checks a standalone dump dataset corresponding to the entry to determine if the dataset has been changed. For example, the standalone dump monitor 35A accesses the dataset for reading to identify if the standalone dump dataset recently recorded dump data, or represents a previous unchanged state of the dataset. If the standalone dump dataset has been changed, the standalone dump monitor 35A initiates preparation of the standalone dump for transmission for diagnosis.

Figure 4:
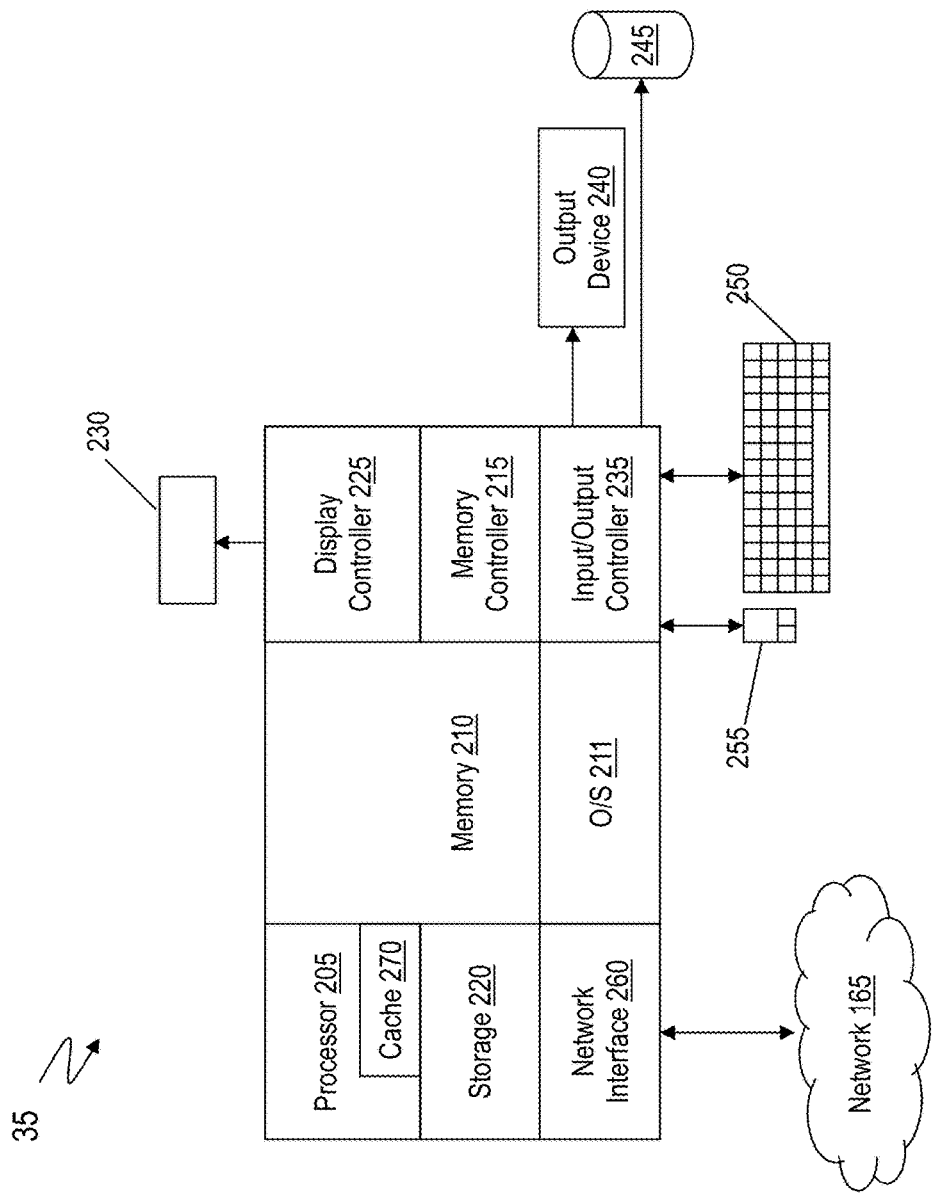
FIG. 4 illustrates an example dump manager in accordance with an embodiment.

FIG. 4 illustrates an example dump manager 35 that is separate from the system 20. In such case, the dump manager 35 may be a computer, such as a desktop computer, a laptop computer, a tablet computer, a phone, or any other computing apparatus including but not limited to a computer embedded in a non-computing machine such as a washing machine or an oil drilling rig. The dump manager 35 includes, among other components, a processor 205, memory 210 coupled to a memory controller 215, and one or more input devices 245 and/or output devices 240, such as peripheral or control devices, that are communicatively coupled via a local I/O controller 245. These devices 240 and 245 may include, for example, battery sensors, position sensors (altimeter, accelerometer, global position signal receiver), indicator/identification lights and the like. Input devices such as a conventional keyboard 250 and mouse 255 may be coupled to the I/O controller 245. The I/O controller 245 may be, for example, one or more buses or other wired or wireless connections, as are known in the art. The I/O controller 245 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the dump manager 35, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The dump manager 35 may further include a display controller 225 coupled to a user interface or display 230. In some embodiments, the display 230 may be an LCD screen. In other embodiments, the display 230 may include a plurality of LED status lights. In some embodiments, the dump manager 35 may further include a network interface 260 for coupling to a network 165. The network 165 may be an IP-based network for communication between the dump manager 35 and an external server, client and the like via a broadband connection. In an embodiment, the network 165 may be a satellite network. The network 165 transmits and receives data between the dump manager 35 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals. The system 20, the standalone dump storage 30, the dump manager 35, the standalone dump dataset list 40, sequential standalone dump storage 50, and the dump directory 60 communicate with each other via the communication network 165.

In an example, the dump initiator 25 may be a part of the system 20, or part of the hardware management console 10. The dump manager 35, in an example, includes components as illustrated in FIG. 4.

Figure 5:
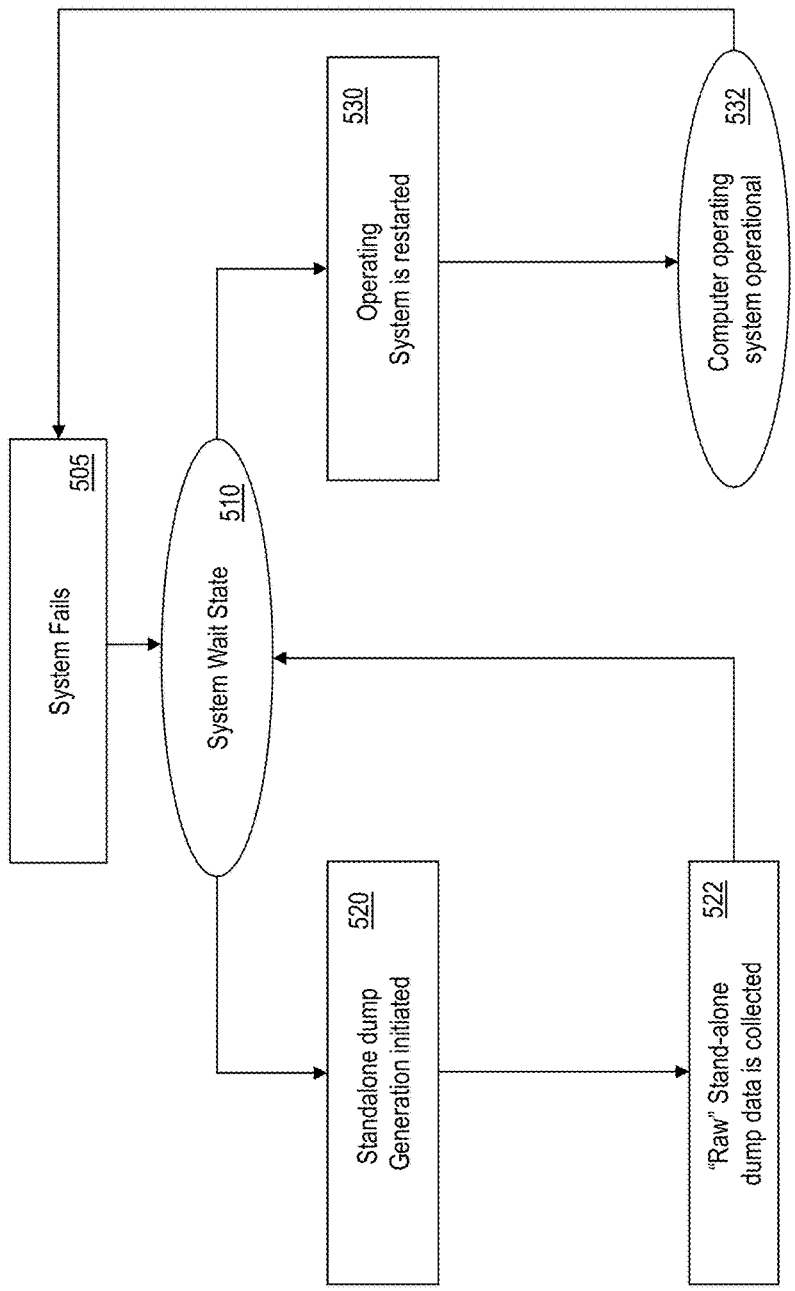
FIG. 5 illustrates a flowchart of example standalone dump creation in accordance with an embodiment.

FIG. 5 illustrates an example standalone dump creation. The system 20 encounters a failure, as shown at block 505, in response to which the system 20 reaches a wait state, as shown at block 510. In an example, when the system 20 enters the wait state, an operator of the system 20 may initiate the dump initiator 25 to record a full-system standalone dump. For example, when the operating system is hard stopped, the operating system enters a wait state. The hard stop may be due to a catastrophic system error, the operating system trying to protect itself from further damage, or due to operator request (for example, in case of a server, a request from the installation's hardware management console, or through an operator console.

The dump initiator 25 initiates a standalone dump generation in response to the wait state, as shown at block 520. In an example, the hardware management console 10 initiates the dump initiator 25 to create the standalone dump. The standalone dump is a system image of the system 20 and contains diagnostic information that a system technician may use to determine a cause of the system failure. For example, the diagnostic information contains state of the registers of the processor(s) 205, the control data structures, and any other data that the operating system of the system 20 marks for storage within the standalone dump.

The dump initiator 25 records the standalone dump to the multi-volume standalone dump storage 30, as shown at block 522. The standalone dump collected that the multi-volume standalone dump storage 30 stores may be 'raw';

that is not in a format to perform diagnostic analysis. The dump initiator 25 records virtual memory contents at the time of the system failure.

The standalone dump storage 30 is where the standalone dump is stored in the pre-allocated datasets. The standalone dump storage 30 may include a non-volatile storage disk such as a flash disk, a holographic storage, a hard disk drive, a solid-state drive, a tape-based storage device, or any other type of a storage disk or a combination thereof. In an example, when the dump initiator 25 completes recording the datasets for the standalone dump, the operator or automated operations may restart the system 20, as shown at block 530, and the operation of the system 20 may continue, as shown at block 532 until a next failure is encountered.

Figure 6:
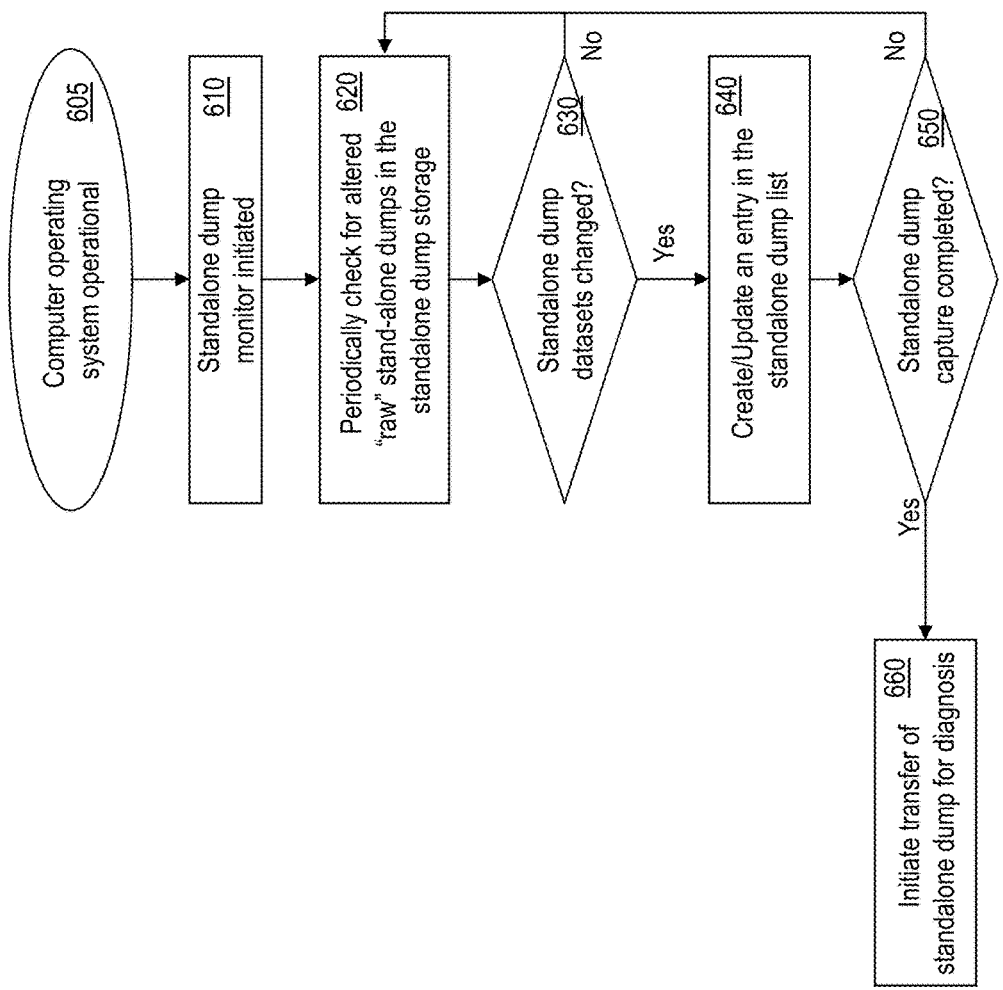
FIG. 6 illustrates a flowchart of example method for transferring standalone dump data of a system to a diagnosis system in accordance with an embodiment.

FIG. 6 illustrates an example method for transferring standalone dump data of the system 20 to a diagnosis system. According to the method, while the system 20 is operational, the standalone dump monitor 35A is initiated, as shown at blocks 605 and 610. For example, the operating system initiates the standalone dump monitor 35A during a startup process of the system 20. Alternatively, the operating system or operator request initiates the standalone dump monitor 35A at a different time than the system startup. The standalone dump monitor 35A periodically checks for altered "raw" stand-alone dumps in the standalone dump storage 30, as shown at block 620. For example, the standalone dump monitor 35A checks if the corresponding pre-allocated datasets in the standalone dump storage 30 have changed since a previous check. If the standalone dump monitor 35A detects a change, the standalone dump monitor 35A may create/update an entry in the standalone dump dataset list 40, as shown at blocks 630 and 640. For example, the standalone dump monitor 35A detects if the system 20 created a new dump dataset, or initialized/modified an existing dump dataset, or deleted an existing dump dataset. In another example, the standalone dump monitor 35A maintains a cached copy of the first few records of a header of the standalone dump datasets with which the standalone dump monitor 35A compares the header data in the current standalone dump dataset.

The standalone dump monitor 35A continues the periodic check, where a frequency of the check may be a predetermined value that an operator of the system 20 can configure. Further, in case the standalone dump monitor 35A detects a change, the standalone dump monitor 35A determines if the change reflects a completion of storage of standalone dump data into the pre-allocated and corresponding standalone dump dataset, as shown at block 650. If the change reflects the completion is, the standalone dump monitor 35A may alert the post-dump manager 35B of the completion to initiate a transfer of the standalone dump for diagnosis, as shown at blocks 650 and 660. Else, the standalone dump monitor 35A continues the periodic check as described herein.

In an example, the system 20 includes multiple servers (such as an IBM SYSPLEX™. The standalone dump monitor 35A may be part of a first server from among the multiple servers. After a predetermined amount of time, or after a predetermined number of periodic checks, the system 20 may select a second server to execute and/or operate the standalone dump monitor 35A. Alternatively, the first server from the multiple servers continues to execute/operate the standalone dump monitor 35A until the system 20 encounters a system failure and restarts, at which time the system may select a different server to execute/operate the standalone dump monitor 35A.

Figure 7:
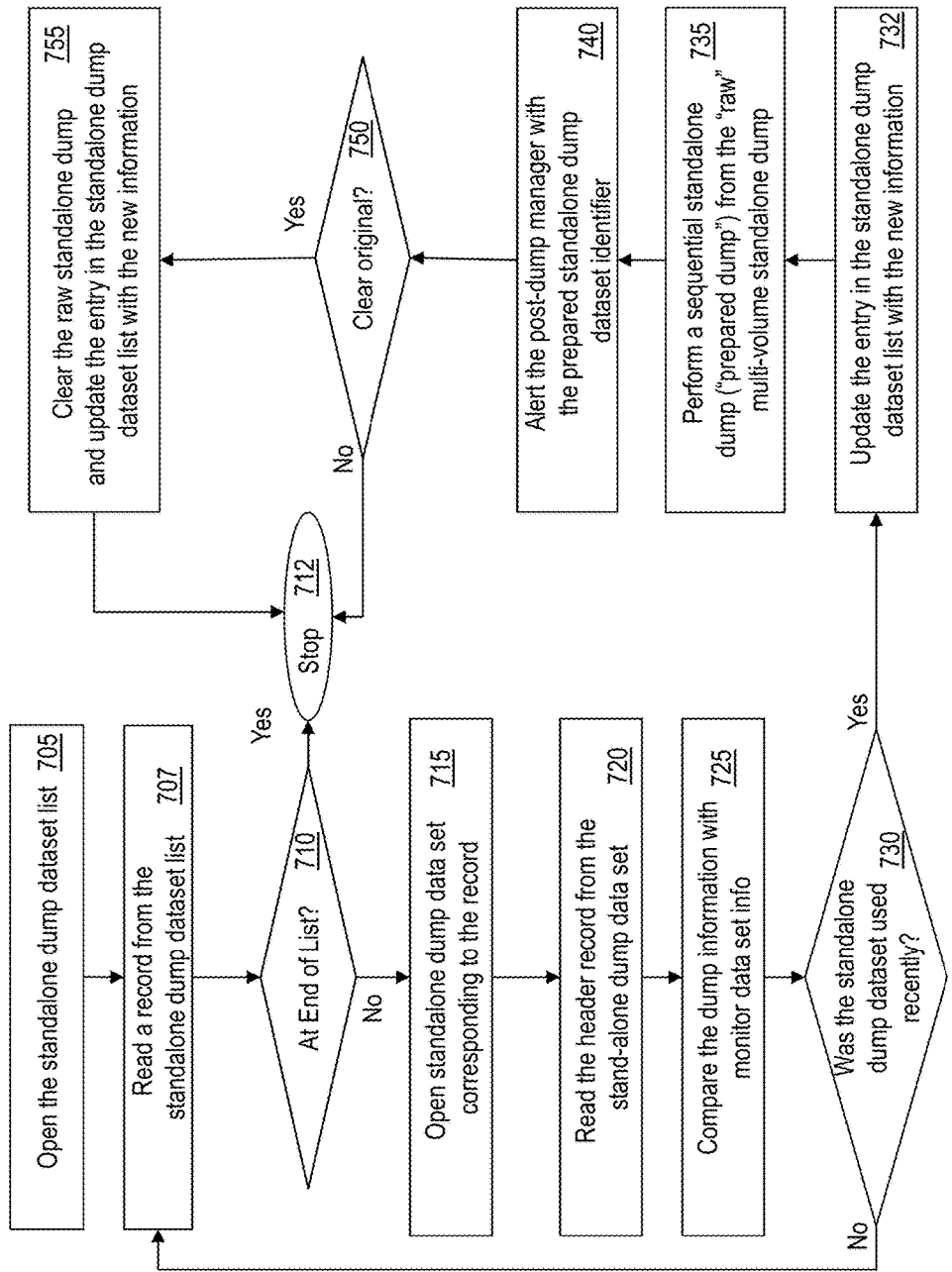
FIG. 7 illustrates a flowchart of example method of determining a change in the standalone dump datasets in accordance with an embodiment.

FIG. 7 illustrates a flowchart of example method of determining a change in the standalone dump datasets. The standalone dump monitor 35A periodically checks for altered "raw" stand-alone dumps in the standalone dump storage 30 to determine if a standalone dump was recorded and alerting the post-dump manager 35B in response. For example, the standalone dump monitor 35A opens the standalone dump dataset list 40, and accesses a first record from the list, as shown at blocks 705 and 707. If the list is empty, or if the standalone dump monitor 35A completes checking all entries in the list, the standalone dump monitor stops and rechecks according to the predetermined schedule, as shown at block 710 and 712.

If the standalone dump monitor 35A obtains an entry (or record) from the standalone dump dataset list 40, the standalone dump monitor 35A opens the raw standalone dump dataset associated with the entry, as shown at block 715. The standalone dump monitor 35A reads a header record for the standalone dump dataset, and compares the information with that in the entry in the standalone dump dataset list 40, as shown at blocks 720 and 725. For example, the standalone dump monitor 35A compares information such as the system name, dump dataset name, time and date the dataset was initially recorded, and the like. In addition, the standalone dump monitor 35A maintains a status-recording area in the entry, with information on the status of each subsequent operation performed on the corresponding dump dataset (such as whether sequentializing was successful, transfer is in progress, and so on).

The standalone dump monitor 35A determines that the dump dataset was recently used to write data, and thus that the system 20 recorded a standalone dump, in case the information differs, as shown at block 730. In this case, the standalone dump monitor 35A updates the entry in the standalone dump dataset list 40 with the new information according to the dump dataset, as shown at block 732. The standalone dump monitor 35A may further prepare the sequential standalone dump using the data from the multi-volume standalone dump datasets, as shown at block 735. For example, the standalone dump monitor 35A may initiate an IPCS COPYDUMP of the multi-volume standalone dump to generate the sequential standalone dump in the sequential standalone dump storage 50. The standalone dump monitor 35A assigns a unique identifier to the sequential standalone dump, such as a name of the multi-volume standalone dump, or any other unique identifier. The standalone dump monitor 35A subsequently alerts the post-dump manager 35B that a recent problem (system failure) occurred and that the corresponding 'prepared' standalone dump dataset is ready for diagnosis, as shown at block 740.

The standalone dump monitor 35A may further determine if the multi-volume standalone dump datasets in the standalone dump storage 30 can be cleared, as shown at block 750. For example, the operator may configure clearing the raw stand-alone dump dataset so that the multi-volume dump dataset may be reused for recording a next standalone dump. For example, in case the dataset is to be cleared, the raw standalone dump dataset is cleared (not deleted), and the standalone dump monitor 35A updates the entry in the standalone dump dataset list 40 accordingly, as shown at block 755. In either case, the standalone dump monitor 35A continues to access a next record from the standalone dump dataset list 40, as shown at block 707.

Figure 8:
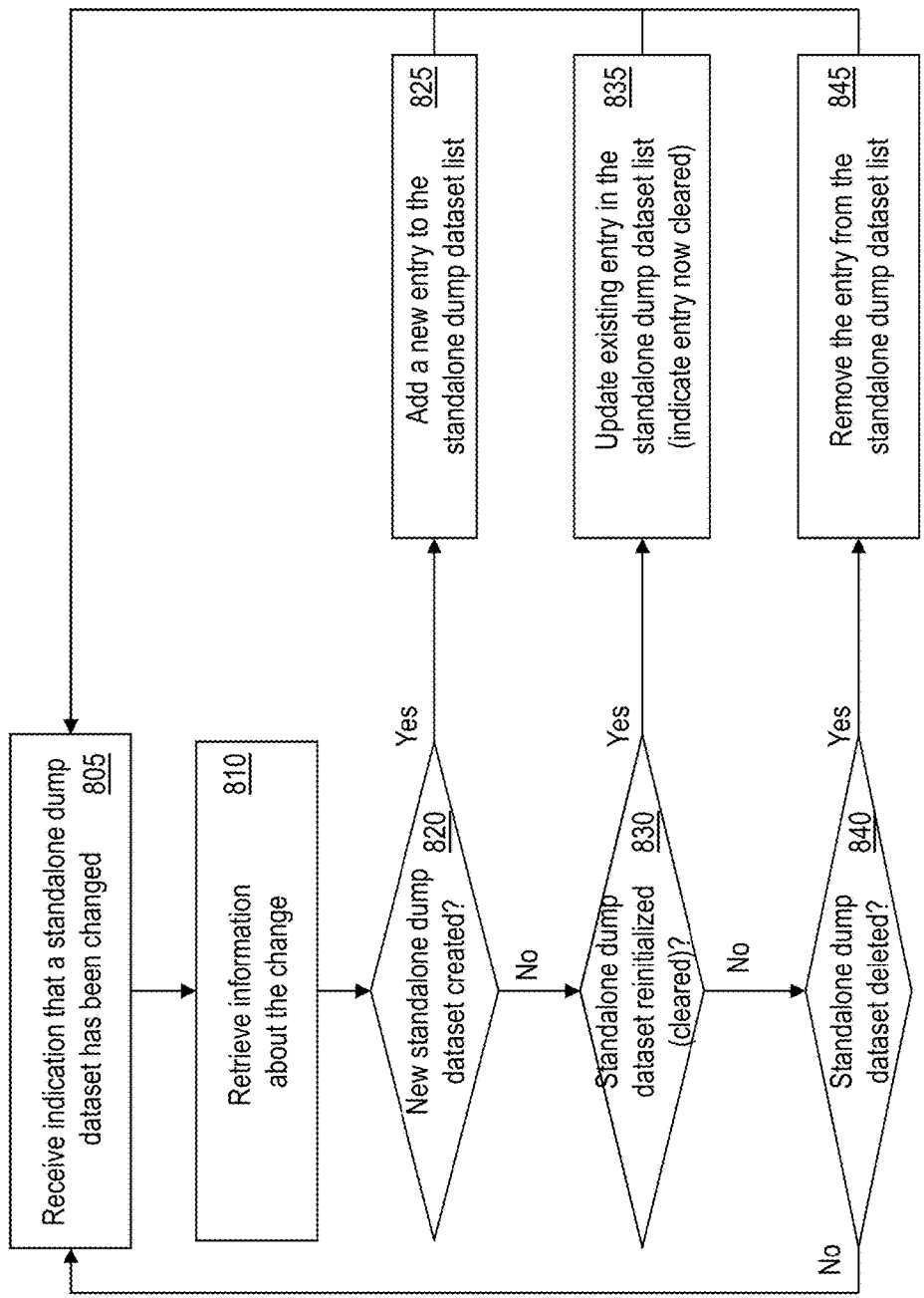
FIG. 8 illustrates a flowchart of an example method for determining changes to a standalone dump in accordance with an embodiment.

FIG. 8 illustrates a flowchart of an example method for the standalone dump monitor 35A to determine creation or change of standalone dumps during system operation, in response to which the standalone dump monitor creates/ updates an entry in the standalone dump dataset list 40, as shown at block 640 (FIG. 6). The standalone dump monitor 35A waits for receiving an indication that the standalone dump dataset has been changed. Upon receipt of such an indication, the standalone dump monitor retrieves information about the change from the entry in the standalone dump dataset list 40, as shown at blocks 805 and 810. If a new stand-alone dump data set was created, then the standalone dump monitor 35A adds a new entry describing the standalone dump dataset to the standalone dump dataset list 40, as shown at blocks 820 and 825. Alternatively, if the change was not a new standalone dump dataset but an existing standalone dump dataset was reinitialized, the standalone dump monitor 35A updates the existing corresponding entry in the standalone dump dataset list 40, as shown at blocks 830 and 835. Alternatively, if the change is not a new standalone dump dataset or a reinitialization, rather a standalone dump data set being deleted, then the standalone dump monitor 35A removes the corresponding entry from the standalone dump dataset list 40, as shown at blocks 840 and 845.

Figure 9:
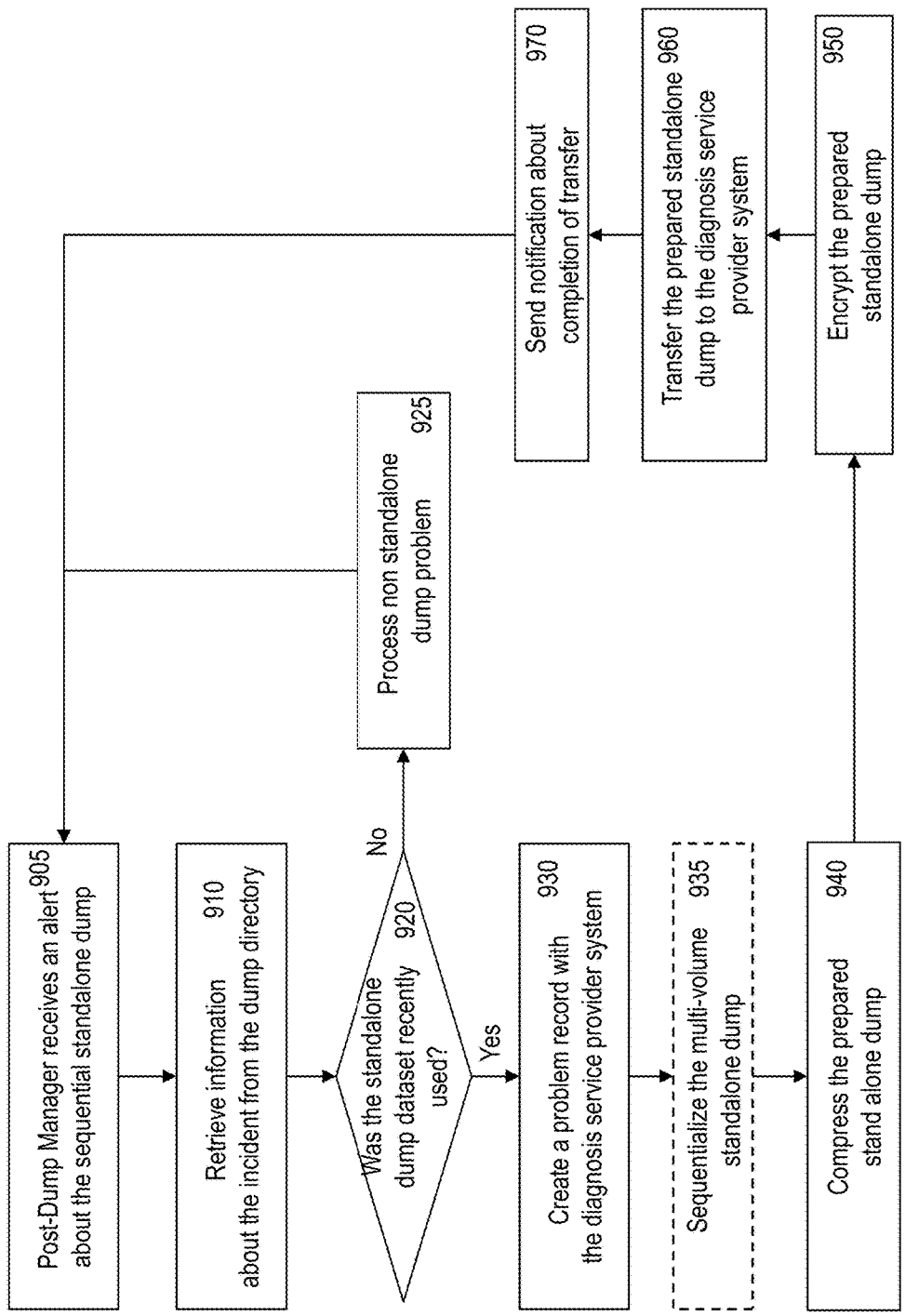
FIG. 9 illustrates a flowchart of an example method of transferring a sequential standalone dump for diagnosis in accordance with an embodiment.

FIG. 9 illustrates a flowchart of an example method of transferring the sequential standalone dump for diagnosis. The post-dump manager receives the alert from the standalone dump monitor 35A upon creating the sequential standalone dump and posting information about the standalone dump in the standalone dump directory 60, as shown at block 905. The post-dump manager retrieves the information about the system failure from the dump directory 60, as shown at block 910. If the entry in the dump directory is not about a standalone dump being recently used, the post-dump manager determines an action to be taken in response to the failure that caused the entry in the dump directory, as shown at blocks 920 and 925. Alternatively, if the entry in the dump directory 60 refers to a standalone dump recently recorded, the post-dump manager 35B creates a problem management record (PMR) with the diagnosis system, as shown at blocks 920 and 930. In an example, the post-dump manager 35B interfaces with the standalone dump monitor 35A, or with the standalone dump dataset list 40 to access the entries in the list 40. For example, for each entry in the list 40, the post-dump manager 35B obtains a dataset name, a system name, time, a date, and other state data of the dump dataset. The post-dump manager 35B further identifies the message log(s) and error log(s) corresponding to the standalone dump dataset of the entry in the standalone dump dataset list 40. The post-dump manager 35B uses information from the message and error logs to populate an interface of the diagnosis service provider to create the PMR (or associate an existing PMR), with the standalone dump.

In an example, the post-dump manager 35B sequentializes the multi-volume standalone dump, as shown at block 935. In this case, the standalone dump monitor 35A does not perform the sequentialization, and instead provides the identifier, location, and other information of the multi-volume dump dataset to the post-dump manager 35B.

Figure 10:
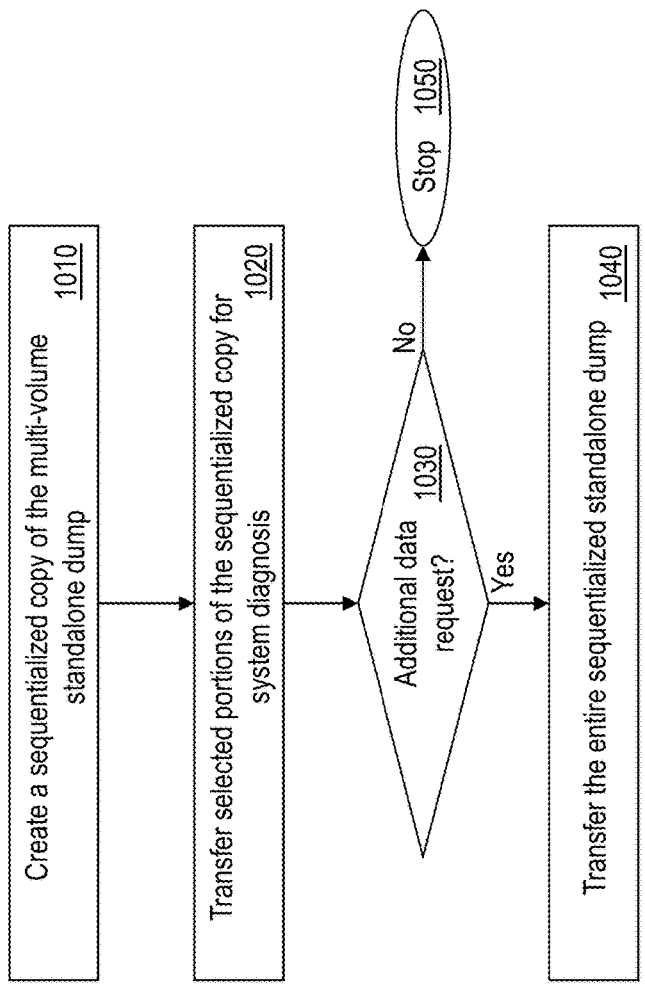
FIG. 10 illustrates a flowchart of an example method of transferring a sequential standalone dump for diagnosis in accordance with an embodiment.

In another example, the post-dump manager 35B sequentializes the multi-volume standalone dump partially. FIG. 10 illustrates a flowchart of an example method of transferring a partially sequentialized standalone dump for diagnosis. For example, the post-dump manager 35B sequentializes the multi-volume standalone dump, as shown at block 1010. The post-dump manager 35B transfers a subset of the sequentialized standalone dump that includes selected portions of the standalone dump, as shown at block 1020. In an example, the selected portion(s) may be based on a predetermined parameters, such as memory addresses, or offsets within the dump data. Alternatively, the selected portions may include a predetermined initial portion of the standalone dump, for example, which includes header information of the recorded dump. The post-dump manager 35B may transfer such a summarized version of the multi-volume standalone dump, which only contains the selected portions of the dump data for system diagnosis, as shown at block 1020. Accordingly, the post-dump manager 35B may transfer a smaller amount of data for diagnosis compared to transferring the entire dump data. The post-dump manager 35B may continue to monitor for receipt of a request from a system diagnosis system for additional data, as shown at block 1030. In an example, the post-dump manager 35B receives an acknowledgement from the system diagnosis system indicative of sufficiency of the summarized version of the dump data for the system diagnosis. Alternatively, in absence of a request for additional data within a predetermined duration since transferring the summarized version, the post-dump manager 35B may stop monitoring for such requests, as shown at block 1050. In case such a request is received, the post-dump manager 35B transfers the entire sequentialized standalone dump for diagnosis, as shown at block 1040.

The post-dump manager 35B may compress and encrypt the sequential standalone dump and then sends the 'prepared' standalone dump to the diagnosis service provider, as shown at blocks 940, 950, and 960. In an example, the diagnosis service provider may identify a particular communication protocol and/or network location for receipt of the standalone dump. For example, the post-dump manager uses file transfer protocol (FTP) to transfer the standalone dump to the diagnosis service provider.

Thus, in response to the alert of the new sequential standalone dump and/or the system failure, the post-dump manager 35B obtains and formats a snapshot of a message log (for example, operlog in Z/OS™) and an error log (for example, logrec in Z/OS™) for a predetermined duration prior to the system failure. The post-dump manager 35B may include the diagnostic data gathering from the logs to aid the diagnosis. The post-dump manager 35B prior to transferring the standalone dump for diagnosis, may format the standalone dump according to a predetermined syntax agreed upon with the diagnosis service provider. In an example, the post-dump manager 35B may transmit the standalone dump via multiple concurrent streams The post-dump manager 35B continues to wait for another alert upon completion of the transfer. In an example, the post-dump manager 35B may notify the operator of the system 20 of the transfer and any identification of the PMR, such as a reference number or any other identifier associated with the PMR and/or the transfer of the standalone dump in this regard, as shown at block 970. In another example, the post-dump manager 35B may send a notification to the standalone dump monitor 35A, which in response, updates the corresponding entries in the dump directory 60 and/or the standalone dump dataset list 40.

The post-dump manager 35B may be invoked to implement the method described herein via an interface, such as a programming interface, a command line interface, a user interface, or any other manner by an operator.

In another example, the system 20 may have a set of pre-allocated standalone dump datasets in which the dump manager 25 captures the standalone dumps. The dump manager 25 may periodically check if the number of available standalone dump datasets in the standalone dump storage 30 is below a predetermined threshold number of available standalone dump datasets, such as 5, 10, or any other predetermined number. For example, the standalone dump monitor 35A may scan through the standalone dump datasets list 40 and count a number of standalone dump datasets that are available. A standalone dump dataset may be marked as available in response to the data in the standalone dump dataset being already transferred for diagnosis, or if the dataset has been cleared. The standalone dump monitor 35A may compare the number of available standalone dump datasets with the predetermined threshold value. In response to the available standalone dump datasets being lower than the predetermined threshold, the dump manager 25 or the system 20 may create new standalone dump datasets in the standalone dump storage 30, resulting in corresponding entries in the standalone dump dataset list 40.

Thus, the technical solutions described herein provide a dump manager, which may include components such as a dump monitor and a post-dump manager, and methods and/or control instructions that the dump manager implements. According to the embodiments of the technical solutions, the dump manager monitors creation, reallocation, and/or deletion of standalone dump datasets by the system. The system creates a standalone dump dataset when the system is about to record a standalone dump. The dump manager maintains an entry corresponding to the standalone dump dataset and monitors changes to the dump dataset. In response to the standalone dump dataset collecting new information, the dump manager updates the corresponding entry. Based on the updated information in the entry, the dump manager initiates a transfer of the standalone dump for diagnosis. In an example, the dump manager creates a PMR with the diagnosis service provider and records a reference number. The dump manager further prepares a sequential standalone dump from a multi-volume copy of the standalone data. The sequentialized standalone dump is then forwarded to the diagnosis service provider, such as via a FTP. The dump manager further updates the entry corresponding to the standalone dump dataset to identify that the data in that dataset has already been sent for diagnosis. The system and/or dump manager may reuse the memory space that is occupied by the dataset, such as by deleting the dataset and/or reallocating the dataset so as to record another dump.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for transferring standalone dump data of a system to a diagnosis system, the method comprising:
   capturing the standalone dump data in response to a system-error, the standalone dump data comprising a plurality of datasets that are stored across a plurality of storage volumes;
   detecting creation of each dataset from the standalone dump data in a corresponding storage volume from the plurality of storage volumes;
   in response to detecting the creation, creating a corresponding entry in a list of standalone dump datasets, each entry indicating a status of an operation performed on the corresponding dataset;
   detecting a change in data stored in the each dataset from the plurality of datasets; and
   in response to detecting a completion of capture of the plurality of datasets:
      updating the corresponding entries from the list of standalone dump datasets to indicate that the datasets have been captured;
   generating a sequential standalone dump based on the plurality of datasets captured concurrently, wherein generating the sequential standalone dump comprises copying data from the datasets in a sequential dataset according to a sequence in which the data is stored in the dataset, and formatting the sequential dataset in a predetermined format; and
      alerting the diagnosis system of the sequential standalone dump; and
      transferring the sequential standalone dump for access by the diagnosis system.

2. The computer implemented method of claim 1, further comprising deleting the datasets in response to generating the sequential standalone dump, wherein other standalone dump data is stored in the storage volumes after being cleared.

3. The computer implemented method of claim 1, further comprising deleting the corresponding entries from the list of standalone dump datasets in response to the datasets being deleted.

4. The computer implemented method of claim 1, wherein each entry in the list of standalone dump datasets comprises a name, a size, a list of volumes, a creation time, and a header of the corresponding dataset.

5. The computer implemented method of claim 1, wherein detecting a change in the data stored in a dataset comprises:
   periodically accessing a predetermined location of the dataset; and
   comparing data stored at the predetermined location with a cached copy of data stored at the predetermined location.

6. The computer implemented method of claim 1, further comprising:
   determining a number of available entries in the list of standalone dump datasets, wherein an available entry indicates that the dataset corresponding to the available entry is free to store standalone dump data; and
   in response to the number of available entries being below a predetermined threshold value, triggering creation of an additional dataset.

7. A system for transferring standalone dump data to a diagnosis system, the system comprising:
   a memory; and
   a processor configured to:
      detect a creation of a dataset from a plurality of datasets of a standalone dump data, the plurality of datasets are stored in corresponding storage volumes from a plurality of storage volumes, the dataset being captured in response to a system-error;
      in response to detecting the creation, create an entry in a list of standalone dump datasets, the entry corresponding to the dataset created, the entry indicative of a status of an operation performed on the dataset;
      detect a change in data stored in the dataset; and
      in response to detecting completion of capturing the dataset:
         update the corresponding entry in the list of standalone dump datasets to indicate that the dataset has been captured;
         generate a sequential standalone dump based on the dataset, wherein generating the sequential standalone dump comprises copying data from the datasets in a sequential dataset according to a sequence in which the data is stored in the dataset, and formatting the sequential dataset in a predetermined format; and alert the diagnosis system of the sequential standalone dump; and transfer the sequential standalone dump for access by the diagnosis system.

8. The system of claim 7, wherein the processor is further configured to delete the standalone dump data stored in the dataset in response to generating the sequential standalone dump, wherein other standalone dump data is stored in the dataset subsequently.

9. The system of claim 7, wherein the processor is further configured to delete the entry in the list of standalone dump datasets in response to the standalone dump data from the dataset being deleted.

10. The system of claim 7, wherein the entry in the list of standalone dump datasets comprises a name, a size, a list of volumes, a creation time, and a header of the standalone dump dataset that is stored in the dataset.

11. The system of claim 7, wherein detection of a change in the data stored in the dataset comprises:

periodically accessing a predetermined location of the dataset; and comparing data stored at the predetermined location with a cached copy of data stored at the predetermined location.

12. The system of claim 7, wherein the processor is further configured to:

transfer a subset of the sequential dataset for diagnosis; and in response to receiving a request for additional data, transfer the entire sequential dataset for the diagnosis.

13. The system of claim 7, wherein the processor is further configured to:

determine a number of available entries in the list of standalone dump datasets, wherein an available entry indicates that the dataset corresponding to the available entry is free to store standalone dump data; and in response to the number of available entries being below a predetermined threshold value, trigger creation of an additional dataset.

14. A computer program product for transferring standalone dump data to a diagnosis system, the computer program product comprising a computer readable storage medium, the computer readable storage medium comprising computer executable instructions, wherein the computer readable storage medium comprises instructions to:

detect creation of a dataset from a plurality of datasets of a standalone dump data, the plurality of datasets are stored in corresponding storage volumes from a plurality of storage volumes, the dataset being captured in response to a system-error;

in response to detecting the creation, create an entry in a list of standalone dump datasets, the entry corresponding to the dataset created, the entry indicative of a status of an operation performed on the dataset;

detect a change in data stored in the dataset; and in response to detecting completion of capturing the dataset:

update the corresponding entry in the list of standalone dump datasets to indicate that the dataset has been captured;

generate a sequential standalone dump based on the dataset, wherein generating the sequential standalone dump comprises copying data from the datasets in a sequential dataset according to a sequence in which the data is stored in the dataset, and formatting the sequential dataset in a predetermined format; and alert the diagnosis system of the sequential standalone dump; and transfer the sequential standalone dump for access by the diagnosis system.

15. The computer program product of claim 14, wherein the computer readable storage medium further comprises instructions to clear the standalone dump data stored in the dataset in response to generating the sequential standalone dump, wherein other standalone dump data is stored in the dataset subsequently.

16. The computer program product of claim 14, wherein the computer readable storage medium further comprises instructions to delete the entry in the list of standalone dump datasets in response to standalone dump data from the dataset being deleted.

17. The computer program product of claim 14, wherein detection of a change in the data stored in the dataset comprises:

periodically accessing a predetermined location of the dataset; and comparing data stored at the predetermined location with a cached copy of data stored at the predetermined location.

18. The computer program product of claim 14, wherein the computer readable storage medium further comprises instructions to:

transfer a subset of the sequential dataset for diagnosis; and in response to receiving a request for additional data, transfer the entire sequential dataset for the diagnosis.

19. The computer program product of claim 14, wherein the computer readable storage medium further comprises instructions to:

determine a number of available entries in the list of standalone dump datasets, wherein an available entry indicates that the dataset corresponding to the available entry is free to store standalone dump data; and in response to the number of available entries being below a predetermined threshold value, trigger creation of an additional dataset.

* * * * *